(12) United States Patent
Kulkarni et al.

(10) Patent No.: US 6,773,149 B2
(45) Date of Patent: Aug. 10, 2004

(54) METHOD, SYSTEM AND COMPUTER PRODUCT FOR PREDICTING HEADLAMP REFLECTOR TEMPERATURE

(75) Inventors: Anant Kulkarni, Maharashtra (IN); Eric Jaarda, Ann Arbor, MI (US); James Wilson, Troy, MI (US); Erwin Liang, Ballston Lake, NY (US)

(73) Assignee: General Electric Company, Pittsfield, MA (US)

( * ) Notice: Subject to any disclaimer, the term of this patent is extended or adjusted under 35 U.S.C. 154(b) by 37 days.

(21) Appl. No.: 10/248,083

(22) Filed: Dec. 17, 2002

(65) Prior Publication Data

US 2004/0114388 A1 Jun. 17, 2004

(51) Int. Cl.⁷ .................................................. F21V 7/00
(52) U.S. Cl. ........................ 362/516; 362/296; 362/341
(58) Field of Search ............................. 362/516, 294, 362/547, 341, 296

(56) References Cited

U.S. PATENT DOCUMENTS

| | | | | |
|---|---|---|---|---|
| 4,779,167 A | * | 10/1988 | Nelson | 362/547 |
| 6,007,224 A | * | 12/1999 | Jiao et al. | 362/518 |
| 6,688,762 B2 | * | 2/2004 | Dinant | 362/547 |
| 2002/0154514 A1 | * | 10/2002 | Yagi et al. | 362/510 |
| 2003/0043586 A1 | * | 3/2003 | Sagal et al. | 362/341 |

OTHER PUBLICATIONS

Infrared Transparent Reflector Materials Sherman K.C. Advances in Automotive Plastic Components and Technology. Conference proceedings Editor(s): GE Plastics, Society of Automotive Engineers Detroit, Mi., Feb. 27–Mar. 2, 1995, p. 49–54, 63 Tr.Ro 1995.

William I. Moore and Christopher R. Powers (Guide Corporation) 2000–01–0801 "Utilizing CFD for Thermal Analysis of a Prototype HID Fog lamp" SAE Technical Paper series.

Liang Erwin W (GE CRD), Kena Yokoyama (GE CRD), Wilson Jim Ge Plastic 2000–01 1396 "Three–Dimensional Heat Transfer and Thermo–elastic Deformation Predictions in Forward Lighting" SAE Technical paper series.

Liang, E.W. (Ge Corporate Research and Development); Lillquist, R.D.; Gallo, J.P.; Poslinski, A.J.; Grimson, A. Strauss, B.R. Predicting the thermal performance of an automotive fog lamp reflector. Proceedings of the 1997 International Congress and Exposition, Detroit, MI, USA Feb. 24–27, 1997.

* cited by examiner

Primary Examiner—Y. My Quach-Lee
Assistant Examiner—Peggy A. Neils

(57) ABSTRACT

A method for predicting headlamp reflector temperature comprising receiving a headlamp type and transmitting a request for an input parameter value responsive to the headlamp type. The input parameter value is received in response to transmitting the request. A transfer function is executed in response to the input parameter and the headlamp type and the execution results in a predicted maximum reflector temperature. The predicted maximum reflector temperature is then output.

21 Claims, 4 Drawing Sheets

METHOD, SYSTEM AND COMPUTER PRODUCT FOR PREDICTING HEADLAMP REFLECTOR TEMPERATURE

BACKGROUND OF INVENTION

The present disclosure relates generally to a method for predicting headlamp reflector temperature and in particular, to a method for predicting the maximum temperature on automotive headlamp reflectors.

A variety of thermoplastic materials are available in the marketplace for use in automotive lighting systems. A basic criterion for material selection in lighting systems is heat resistance and in general, the higher the heat resistance, the higher the cost of the thermoplastic. Heat resistance is the maximum temperature the components can sustain indefinitely without degradation of function. If the component is a headlamp reflector, the maximum temperature of the reflector can be affected by design considerations such as reflector diameter, bulb diameter, bulb depth, lens depth, spacer depth and reflector depth. Predicting the maximum temperature for use in the selection of materials in lighting applications, such as the headlamp reflector material, can involve detailed fluid dynamics and heat transfer analysis for a particular configuration. The process of performing detailed fluid analysis and heat transfer analysis for each configuration in order to determine the maximum temperature on the reflector (hot spot) can be cumbersome and time consuming. Estimating the maximum temperature accurately Is important in order to avoid the expense and time associated with re-creating thermoplastic molding tools and processes.

SUMMARY OF INVENTION

One aspect of the invention is a method for predicting headlamp reflector temperature. The method comprises receiving a headlamp type and transmitting a request for an input parameter value responsive to the headlamp type. The input parameter value is received in response to transmitting the request. A transfer function is executed in response to the input parameter and the headlamp type and the execution results in a predicted maximum reflector temperature. The predicted maximum reflector temperature is then output.

Another aspect of the invention is a method of creating a transfer function for calculating a predicted maximum reflector temperature. The method comprises receiving a headlamp application group including a member. The member is classified based on geometric primitives and the classification results in a headlamp type. Key material and geometric parameters that affect a predicted maximum reflector temperature for the headlamp type are identified. A simple parametric geometric model is created responsive to the key material and geometric parameters. A design space is set for the key material and geometric parameters. The method further comprises creating a set of design of experiments in response to the design space and the model. The set of design of experiments is carried out and results in output. A transfer function is derived to calculate the predicted maximum reflector temperature for the headlamp type responsive to the output. The predicted maximum reflector temperature varies in response to an input parameter.

Another aspect of the invention is a system for predicting headlamp reflector temperature. The system comprises a network, a user system in communication with the network, a storage device and a host system. The host system is in communication with the network and the storage device and the host system includes application software to implement a method comprising receiving a headlamp type from the user system via the network. The method further comprises transmitting a request across the network for an input parameter value responsive to the headlamp type. The input parameter value is received from the user system via the network in response to transmitting the request. A transfer function stored on the storage device is executed in response to the input parameter and the headlamp type and the execution results in a predicted maximum reflector temperature. The predicted maximum reflector temperature is then output to the user system via the network.

A further aspect of the invention is a computer program product for predicting headlamp reflector temperature. The computer program product comprises a storage medium readable by a processing circuit and storing instructions for execution by the processing circuit for performing a method. The method comprises receiving a headlamp type and transmitting a request for an input parameter value responsive to the headlamp type. The input parameter value is received in response to transmitting the request. A transfer function is executed in response to the input parameter and the headlamp type and the execution results in a predicted maximum reflector temperature. The predicted maximum reflector temperature is then output.

Further aspects of the invention are disclosed herein. The above discussed and other features and advantages of the invention will be appreciated and understood by those skilled in the art from the following detailed description and drawings.

BRIEF DESCRIPTION OF DRAWINGS

Referring to the exemplary drawings wherein like elements are numbered alike in the several FIGURES.

DETAILED DESCRIPTION

An embodiment of the present invention includes several complimentary components that can be utilized to rapidly provide a prediction of hot-spot temperatures for headlamps, bypassing the need for many man days of finite element modeling and many hours of computer processing unit time. Various lamps are characterized into general classes according to their basic shape. For example, fog lamps can be characterized into teardrop, round, square and oval. Each class is then parameterized by assigning suitable geometric primitives that both approximate the basic shape and which can be varied more or less independently. An experimental design is created for each class that outlines what range of parameters and bulb wattages should be fully explored to adequately describe each class. Next, the experiments specified in the experimental design are carried out by calculating, via three-dimensional fluid dynamics, the hot-spot temperature of each parameterized design/wattage combination indicated by the design experiment. The results of the experiments are fed back through a statistical experimental analysis, and the significant parameters are culled and the transfer functions that relate the hot-spot temperature to those significant parameters are derived. A user can access the hot-spot calculator through a graphical user interface that is customized to accept the headlamp class and the significant parameters. The class and parameters are fed as inputs to the previously derived transfer functions and the resulting output is a predicted hot-spot temperature, or maximum temperature. The calculator can be deployed in a variety of manners Including: web deployed, personal digital assistant deployed, and personal computer deployed.

Figure 1:
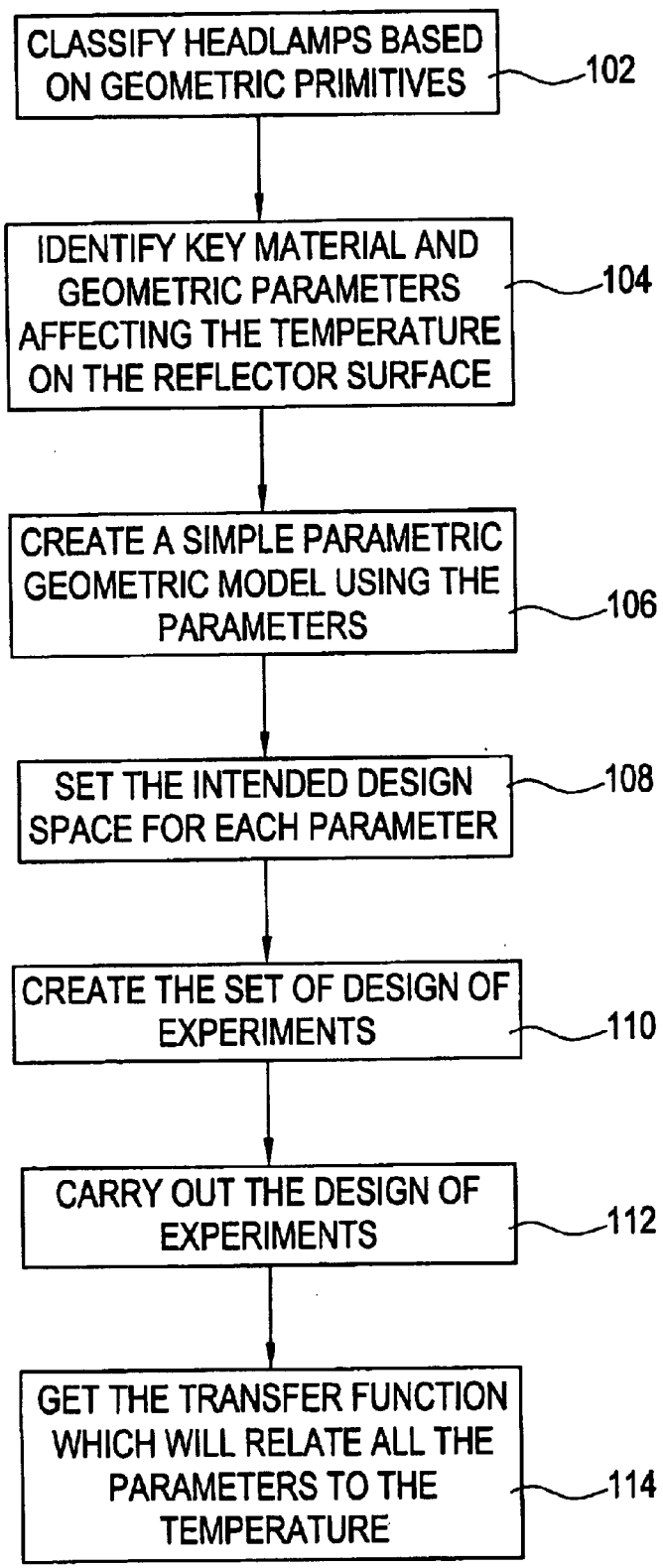
FIG. 1 is a block diagram of an exemplary process to create a calculator for predicting headlamp reflector temperature.

FIG. 1 is a block diagram of an exemplary process to create a calculator for predicting headlamp reflector temperature. At step 102, the headlamps within an application group are classified based on geometric primitives, resulting in headlamp types. For example, in the case of automotive lighting applications, there are several application groups such as fog lamps and motorcycle lamps that can be further broken down and classified based on their geometric primitives into headlamp types (e.g., round, square, oval). A variety of thermoplastic materials are available from resin manufacturers for use in automotive lamps. A key criteria for selecting a particular thermoplastic material from the group of available thermoplastic materials includes the heat resistance required by the automotive lamp and the heat resistance provided by the particular thermoplastic material. The effect of varying geometric and material parameters on the required heat resistance (also referred to as the hot-spot temperature) in automotive lamps can be categorized based on geometric primitives. Geometric primitives dictate the shape of the automotive lamp (e.g., round, teardrop, square).

Next, at step 104, the key material and geometric parameters affecting the temperature on the reflector surface are identified for a particular class of headlamps within an application group. For example, a lamp in the fog lamp application group with a round classification may include geometric parameters such as reflector diameter, reflector depth and wattage of the bulb. Material parameters may include thermal conductivity of material and emissivity of reflective coating. At step 106, a simple parametric geometric model is created utilizing the parameters. This simple parametric geometric model covers almost all headlamps in the classification group by varying the key parameters. See FIG. 3, below, for an example of a parametric model for a round fog lamp. The intended design space, or parameter range, is set at step 108. At step 110, a design of experiments (DOE) is created for the parametric geometric model. The DOE includes a number of experiments based on possible combinations of geometric, material and process parameters. The DOE can be created using an automated tool (e.g., Design for Six Sigma from Minitab, Inc., Regression, Response Surface Methodology from Minitab, Inc.). Inputs to the DOE tool include the simple parametric geometric model, the intended design space and the parameters. The output from the DOE tool Includes a set of experiments that will cover the design space and that should be performed in order to determine an associated transfer function that correlates the parameters to the temperature on the reflector surface.

At step 112, the set of experiments described by the output of the DOE tool is performed. In an exemplary embodiment, the experiments are carried out utilizing heat transfer and flow analysis simulation tools (i.e., computational fluid dynamics) to determine the temperature distribution on the reflector surface. Thermal prediction software (e.g., FLUENT from Fluent, Inc.) is utilized to conduct these experiments in a virtual environment. When all of the experiments have been completed, or simulated, a transfer function is derived at step 114 using the results of the experiments. The resulting transfer function relates input parameters (all or a subset of the key parameters in the simple parametric geometric model) to the temperature on the reflector surface. The transfer function is created using a separate regression analysis tool (e.g., Minitab from Minitab, Inc.). Alternatively, the transfer function is created using the DOE tool. The transfer function relates the response variable (the maximum temperature) to the key parameters considered for the DOE. The derived transfer function is then utilized for calculating the maximum temperature on the reflector surface. Geometric and material parameter values for specific customer applications within the design space are input to the transfer function via the calculator. A different transfer function is derived for each class of headlamp, or for each parametric geometric model created in step 106. In an exemplary embodiment, the transfer function is stored in a database of transfer functions that are indexed by headlamp classification within an application group. The processing described in FIG. 1 is repeated for each headlamp classification defined in step 102 and for headlamps in the other application groups based on implementation requirements.

Figure 2:
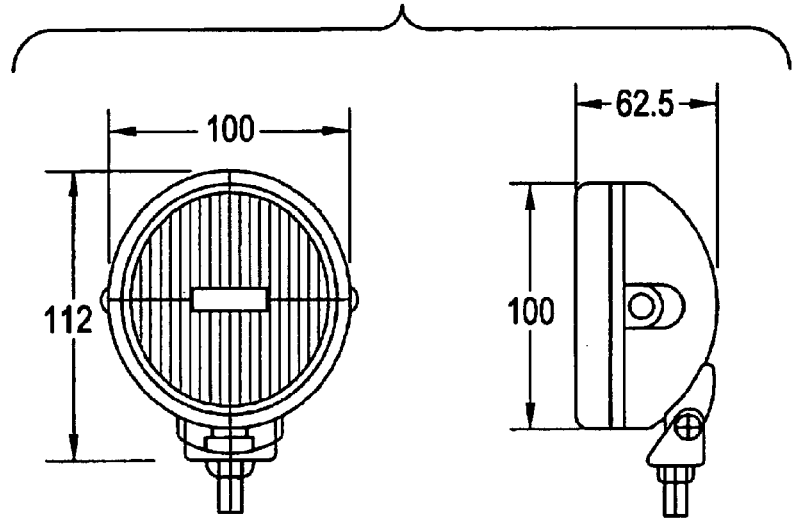
FIG. 2 is an example of the geometry that could be associated with a fog lamp.
Figure 3:
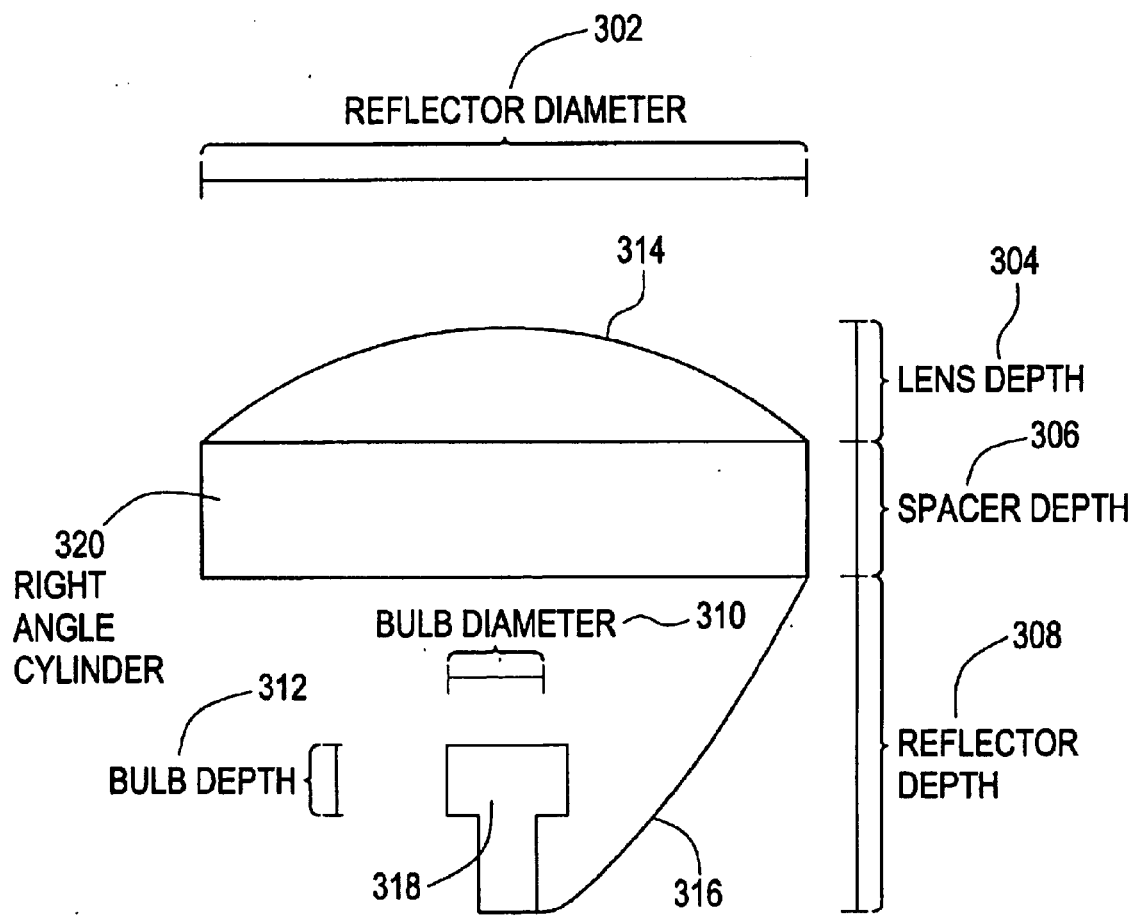
FIG. 3 is an example of a simplified parametric model for the fog lamp depicted in FIG. 2.

FIG. 2 is an example of the geometry that is associated with a fog lamp, one of the application groups for automotive headlamps. The headlamp includes a bulb, a reflector, a lens, a decorative bezel and a housing unit. As shown in FIG. 2, the fog lamp is four and a half inches high, four inches wide, and two and seven sixteenths inches deep. Additionally, the fog lamp depicted in FIG. 2 is classified as a round fog lamp. FIG. 3 is a simplified parametric model associated with the fog lamp depicted in FIG. 2. The parameters depicted in FIG. 3 can be utilized to create the hot-spot calculator. In addition, several of the parameters depicted in FIG. 3 may be input to the hot-spot calculator in order to predict a maximum reflector temperature. The basic geometric primitives for this parametric model include: circular arc 314, parabolic curve 316 (note that the reflector is generally, but not necessarily parabolic, and that other shapes, for example a polyelipsoid can also be employed in an alternate embodiment) and right angle cylinder 320. The fog lamp application group can be broken down into classes based on these basic geometric primitives and can result in classes such as teardrop shaped, round and square depending on the values of the geometric primitives. Also shown in FIG. 3 are parameters that may affect the temperature of the reflector in a fog lamp including reflector diameter 302, lens depth 304, spacer depth 306, reflector depth 308, bulb diameter 310, bulb depth 312. In addition, the wattage of the bulb 318 will also have an effect on the temperature of the reflector. These are the variables that will be tested through the DOE process and may be reflected in the resulting transfer function depending on the results of the DOE. For other application groups (e.g., high beam lamps) other geometric primitives and parameters may be utilized to describe the application group and the associated classes.

Figure 4:
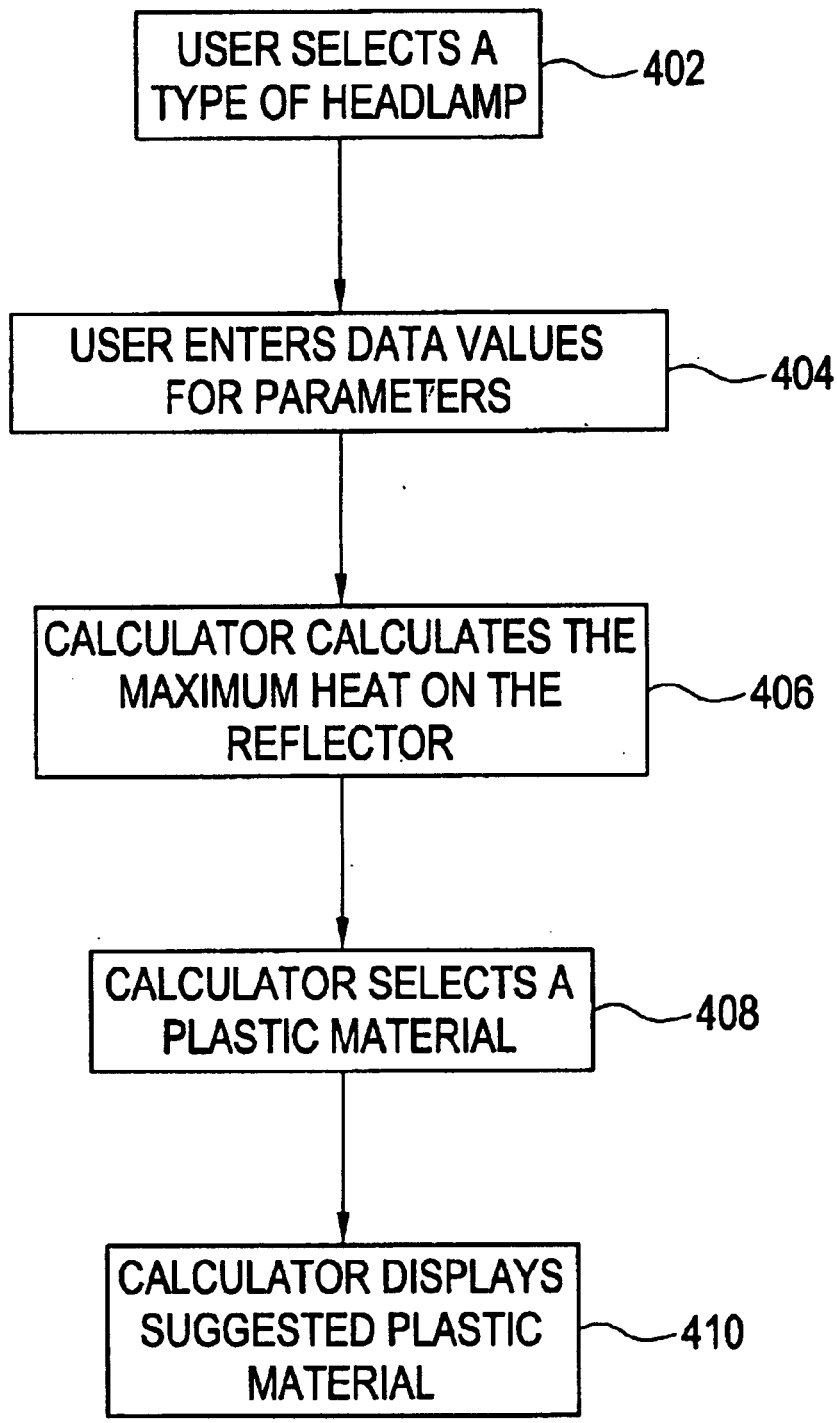
FIG. 4 is a block diagram of an exemplary process for utilizing a calculator to predict headlamp reflector temperature.

FIG. 4 is a block diagram of an exemplary process for utilizing a calculator to predict headlamp reflector temperature. The process depicted in FIG. 4 includes a user accessing the hot-spot calculator from a user system or from a hand held device. At step 402, the user selects a type of headlamp which includes selecting an application group (e.g., fog lamps, motorcycle lamps) and within the application group a particular classification (e.g., round, square, teardrop shape). At step 404, the user enters input parameter data values in response to a prompt from the calculator. Parameter values include values for the key parameters that were determined to have an impact on the reflector temperature during the DOE process. Next, step 406 is performed and the hot-spot calculator calculates the maximum heat on the reflector using the transfer function developed as described in reference to FIG. 1. Based on the results of the transfer function, the calculator, at step 408, selects, or recommends, a thermoplastic material with an adequate heat resistance rating. The calculator can be vendor specific and recommend a thermoplastic material that the vendor produces or it could be vendor independent and include thermoplastic materials from several vendors. For example, the result of step 406 may be that the maximum heat on the reflector is one hundred and ninety degrees Celsius. Then, at step 408, the calculator would suggest a thermoplastic material with a maximum heat capacity that exceeds one hundred and ninety degrees Celsius. At step 410, the calculator displays the suggested material and results of the transfer function. The user can perform this process, from step 402 through 410, any number of times and can use this data as input to the design process.

Figure 5:
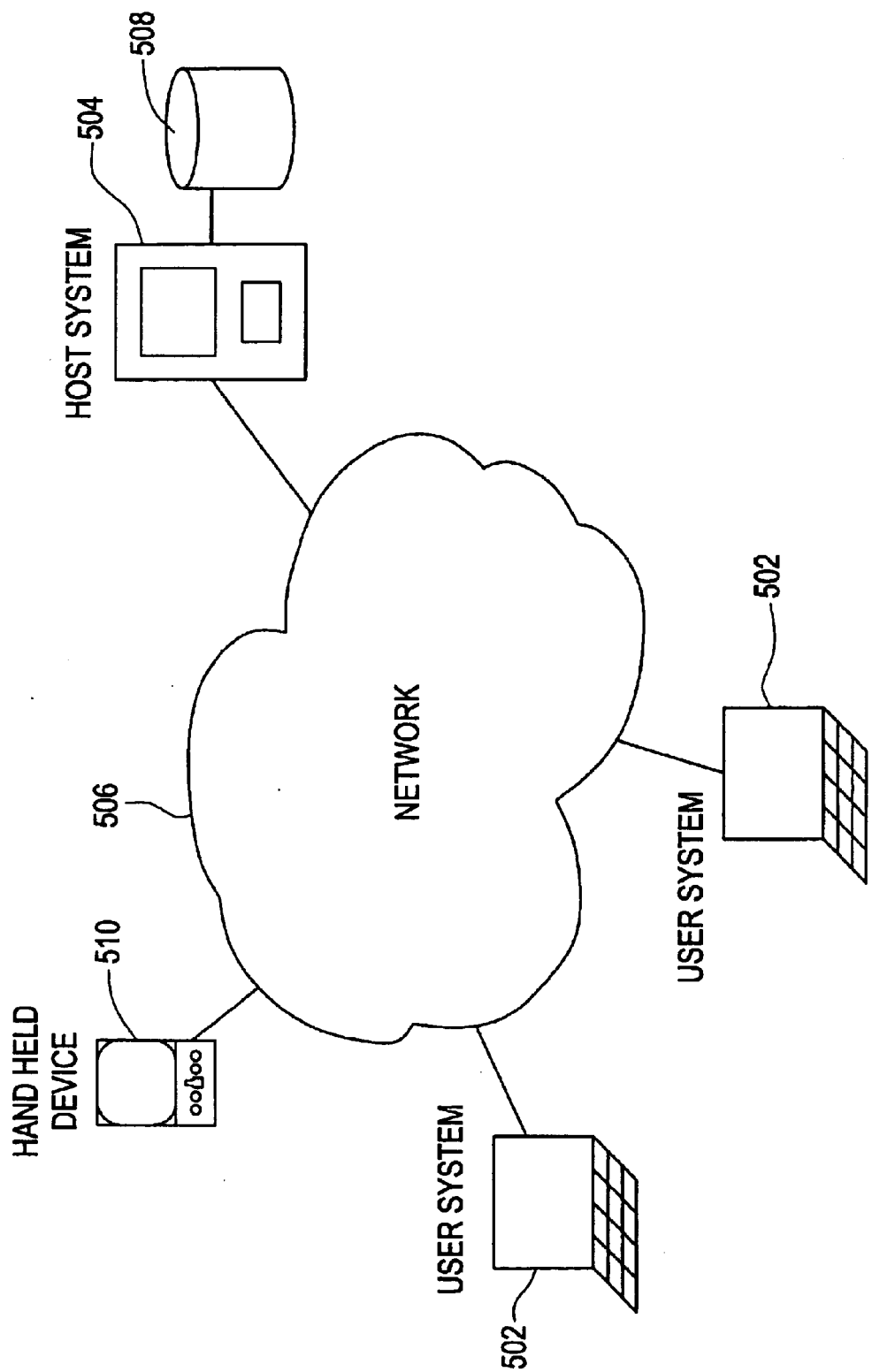
FIG. 5 is a block diagram of an exemplary system for predicting headlamp reflector temperature.

FIG. 5 is a block diagram of an exemplary system for predicting headlamp reflector temperature. The system of FIG. 5 depicts how a user (e.g., a designer, a field engineer, an external customer) can make a request, through a user system 502 (e.g., a personal computer, a host attached terminal) or a hand held device 510 (e.g., a personal digital assistant) to an application program on the host system 504 to access the calculator for predicting headlamp reflector temperature. The users can be physically located in one or more geographic locations and can be directly connected to the host system 504 or coupled to the host system via the network 506. In an exemplary embodiment, the host system 504 executes programs that provide access to the calculator for predicting headlamp reflector temperature and data relating to the temperature prediction (e.g., transfer functions) are stored on the storage device 508 attached to the host system. Each user system 502 and hand held device 510 may be implemented using a general-purpose computer executing a computer program for carrying out the processes described herein. If the user system 502 or hand held device 510 includes a personal computer, the processing described herein may be shared by a user system 502 or hand held device 510 and the host system 504 by providing an applet to the user system 502.

The network 506 may be any type of known network including a local area network (LAN), a wide area network (WAN), an intranet, or a global network (e.g., Internet). A user system 502 or hand held device 510 may be coupled to the host system 504 through multiple networks (e.g., intranet and Internet) so that not all user systems 502 and hand held devices 510 are required to be coupled to the host system 504 through the same network. One or more of the user systems 502, hand held device 510 and host system 504 may be connected to the network 506 in a wireless fashion and the network 506 may be a wireless network.

The host system 504 may be implemented using a server operating in response to a computer program stored in a storage medium accessible by the server. The host system 504 may operate as a network server (often referred to as a web server) to communicate with the user systems 502 and hand held device 510. The host system 504 handles sending and receiving information to and from user systems 502 and hand held devices 510, and can perform associated tasks. The host system 504 may also include a firewall to prevent unauthorized access to the host system 504 and enforce any limitations on authorized access.

The host system 504 also operates as an application server. The host system 504 executes one or more application programs to create and implement the calculator for predicting headlamp reflector temperature. In an alternate embodiment, the host system 504 includes application programs to implement the calculator for predicting headlamp reflector temperature and the application programs to create the calculator reside remotely from the host system 504. Processing may be shared by the user system 502 and/or hand held device 510 and the host system 504. Alternatively, the user systems 502 and hand held device 510 may include stand-alone software applications for performing all or a portion of the processing described herein. It is understood that separate servers may be used to implement the network server functions and the application server functions.

The storage device 508 may be implemented using a variety of devices for storing electronic information such as a file transfer protocol (FTP) server. It is understood that the storage device 508 may be implemented using memory contained in the host system 504 or it may be a separate physical device. The storage device 508 contains a variety of information relating to predicting headlamp reflector temperature including a database of transfer functions and associated parameters for various classes of headlamps within application groups. The host system 504 may also operate as a database server and coordinate access to application data including data stored on the storage device 508. The data stored in the storage device 508 can be physically stored as a single database with access restricted based on user characteristics or it can be physically stored in a variety of databases including portions of the database on the user systems 502, hand held device 510 and host system 504.

An embodiment of the present invention can be utilized for determining the maximum temperature of a component in a variety of lighting applications and is not limited to automotive lighting nor to reflector components of lamps. Types of lighting applications that may utilize an embodiment of the present invention include, but are not limited to: fog lamps, car head lights, motorcycle lights, projector lamps, industrial lighting and commercial lighting. In addition, an embodiment of the present invention can be expanded to other design spaces and is not limited to lamps. For example, embodiments of the present invention may be utilized: to perform thermal evaluation of electrical enclosures, for structural evaluation of energy absorbing applications, for evaluation of a simplified part manufacturing process, and to perform a quick evaluation of the desired functionality of an application or product with fair accuracy before selecting an application or product from a range available in the market.

The methodology for developing the calculator is based on generating transfer functions that are derived from three-dimensional thermal analysis of generic parametric models representing configurations currently utilized in lighting design. The simulation tools and statistical tools used for the analysis that are utilized to build the hot-spot calculator are commercially available. Design of experiment (DOEs) techniques are utilized in order to derive the transfer functions. The use of the resulting hot-spot calculator can reduce the time required for the material selection process, which in turn can reduce product design cycle time. Design trade-off studies can be carried out for various lighting system shapes and parameters by utilizing the hot-spot calculator.

An embodiment of the present invention provides for a method to estimate the temperature of headlamp reflectors that is completely based on transfer functions. This can result in a quick estimate that can be utilized at the conceptual level of design and can allow a designer to obtain several estimates and use the results in creating the design of the headlamp. An embodiment of the present invention is web enabled and can be utilized by field engineers, or authorized customers, to assist customers in making immediate material selection decisions for specific applications. Also, the ability to estimate the maximum temperature of a headlamp reflector can result in choosing the most economic thermoplastic material that meets the design requirements. This can also result in eliminating costly rework to thermoplastic molding tools or processes.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. An embodiment of the invention can also be embodied in the form of computer program code, for example whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A method for predicting headlamp reflector temperature, the method comprising:
   receiving a headlamp type;
   transmitting a request for an input parameter value responsive to said headlamp type;
   receiving said input parameter value in response to said transmitting a request;
   executing a transfer function in response to said input parameter and said headlamp type, said executing resulting in a predicted maximum reflector temperature; and
   outputting said predicted maximum reflector temperature.

2. The method of claim 1 further comprising:
   selecting a type of thermoplastic material that exhibits a heat resistance that exceeds said predicted maximum reflector temperature; and
   outputting said type of thermoplastic material in response to said selecting.

3. The method of claim 1 further comprising creating said transfer function, said creating said transfer function including:
   receiving a headlamp application group including a member;
   classifying said member based on geometric primitives resulting in said headlamp type;
   identifying key material and geometric parameters that affect said predicted maximum reflector temperature for said headlamp type;
   creating a simple parametric geometric model responsive to said key material and geometric parameters;
   setting a design space for said key material and geometric parameters;
   creating a set of design of experiments in response to said design space and said model;
   carrying out said set of design of experiments resulting in design of experiment output; and
   deriving said transfer function to calculate said predicted maximum reflector temperature for said headlamp type responsive to said design of experiment output wherein said predicted maximum reflector temperature varies in response to said input parameter.

4. The method of claim 3 wherein said input parameter includes one of said key material and geometric parameters.

5. The method of claim 3 wherein said headlamp application group is a fog lamp group.

6. The method of claim 3 wherein said headlamp type is one of round fog lamp, teardrop fog lamp and square fog lamp.

7. The method of claim 3 wherein said geometric primitives include arc of circle, parabolic curve and right angle cylinder.

8. The method of claim 3 wherein said key material and geometric parameters include two or more of reflector diameter, lens depth, spacer depth, reflector depth, bulb diameter, bulb depth and wattage of bulb.

9. The method of claim 3 wherein said design space includes the maximum and minimum values for said key material and geometric parameters.

10. The method of claim 3 wherein said creating a set of design of experiments is performed using a statistical analysis tool.

11. The method of claim 3 wherein said carrying out said set of design of experiments is performed using heat transfer and flow analysis simulation tools.

12. The method of claim 3 wherein said deriving a transfer function is performed using regression analysis software.

13. A method of creating a transfer function for calculating a predicted maximum headlamp reflector temperature, said method comprising:
   receiving a headlamp application group including a member;
   classifying said member based on geometric primitives resulting in a headlamp type;
   identifying key material and geometric parameters that affect a predicted maximum reflector temperature for said headlamp type;
   creating a simple parametric geometric model responsive to said key material and geometric parameters;
   setting a design space for said key material and geometric parameters; creating a set of design of experiments in response to said design space and said model;
   carrying out said set of design of experiments resulting in output; and deriving a transfer function to calculate said predicted maximum reflector temperature for said headlamp type responsive to said output wherein said predicted maximum reflector temperature varies in response to an input parameter.

14. A system for predicting headlamp reflector temperature, the system comprising:

a network;

a user system in communication with said network;

a storage device; and a host system in communication with said network and said storage device, said host system including application software to implement a method comprising:

receiving a headlamp type from said user system via said network;

transmitting a request across said network for an input parameter value responsive to said headlamp type;

receiving said input parameter value from said user system via said network in response to said transmitting a request;

executing a transfer function stored on said storage device in response to said input parameter and said headlamp type, said executing resulting in a predicted maximum reflector temperature; and outputting said predicted maximum reflector temperature to said user system via said network.

15. The system of claim 14 wherein said host system includes application software to implement a method further comprising creating said transfer function, said creating said transfer function including:

receiving a headlamp application group including a member;

classifying said member based on geometric primitives resulting in said headlamp type;

identifying key material and geometric parameters that affect said predicted maximum reflector temperature for said headlamp type;

creating a simple parametric geometric model responsive to said key material and geometric parameters;

setting a design space for said key material and geometric parameters;

creating a set of design of experiments in response to said design space and said model;

carrying out said set of design of experiments resulting in design of experiment output; and deriving said transfer function to calculate said predicted maximum reflector temperature for said headlamp type responsive to said design of experiment output wherein said predicted maximum reflector temperature varies in response to said input parameter.

16. The system of claim 14 wherein said user system is a hand held device.

17. The system of claim 14 wherein said network is a wireless network.

18. The system of claim 14 wherein said network is the Internet.

19. The system of claim 14 wherein said network is an intranet.

20. A computer program product for predicting headlamp reflector temperature, the computer product comprising:

a storage medium readable by a processing circuit and storing instructions for execution by the processing circuit for performing a method comprising:

receiving a headlamp type;

transmitting a request for an input parameter value responsive to said headlamp type;

receiving said input parameter value in response to said transmitting a request;

executing a transfer function in response to said input parameter and said headlamp type, said executing resulting in a maximum reflector temperature; and outputting said predicted maximum reflector temperature.

21. The computer program product of claim 20 wherein said storage medium includes instructions to implement a method further comprising creating said transfer function, said creating said transfer function including:

receiving a headlamp application group including a member;

classifying said member based on geometric primitives resulting in said headlamp type;

identifying key material and geometric parameters that affect said predicted maximum reflector temperature for said headlamp type;

creating a simple parametric geometric model responsive to said key material and geometric parameters;

setting a design space for said key material and geometric parameters;

creating a set of design of experiments in response to said design space and said model;

carrying out said set of design of experiments resulting in design of experiment output; and deriving said transfer function to calculate said predicted maximum reflector temperature for said headlamp type responsive to said design of experiment output wherein said predicted maximum reflector temperature varies in response to said input parameter.

* * * * *